(12) United States Patent
Cole et al.

(10) Patent No.: US 11,087,895 B2
(45) Date of Patent: Aug. 10, 2021

(54) LIQUID TANK INSPECTION INCLUDING DEVICE FOR LAUNCHING SUBMERSIBLE

(71) Applicant: ABB Power Grids Switzerland AG, Baden (CH)

(72) Inventors: Gregory A. Cole, West Hartford, CT (US); William J. Eakins, Bloomfield, CT (US); Daniel T. Lasko, Bloomfield, CT (US); Harshang Shah, West Hartford, CT (US); Thomas A. Fuhlbrigge, Ellington, CT (US); Biao Zhang, Ballwin, CT (US); Luiz Cheim, St. Charles, MO (US); Poorvi Patel, West Hartford, MO (US); Gregory F. Rossano, Enfield, CT (US); Andrew Salm, West Hartford, CT (US); Sanguen Choi, Simsbury, CT (US)

(73) Assignee: ABB Power Grids Switzerland AG, Baden (CH)

( * ) Notice: Subject to any disclaimer, the term of this patent is extended or adjusted under 35 U.S.C. 154(b) by 55 days.

(21) Appl. No.: 16/434,672

(22) Filed: Jun. 7, 2019

(65) Prior Publication Data

US 2019/0287688 A1   Sep. 19, 2019

Related U.S. Application Data

(63) Continuation of application No. PCT/IB2017/001643, filed on Dec. 7, 2017.
(Continued)

(51) Int. Cl.
*G21C 17/013* (2006.01)
*G02B 23/24* (2006.01)
(Continued)

(52) U.S. Cl.
CPC ............. *G21C 17/013* (2013.01); *B25J 1/00* (2013.01); *B25J 13/00* (2013.01); *B25J 19/02* (2013.01);
(Continued)

(58) Field of Classification Search
CPC .. G01N 9/08; G01N 9/10; G01N 9/02; G01N 9/20; G01N 21/85; G01G 5/02; B25J 1/00;
(Continued)

(56) References Cited

U.S. PATENT DOCUMENTS 3,294,121 A * 12/1966 Powell ................ F16L 55/1657
138/97
3,457,932 A * 7/1969 Wakefield, Jr. ......... F16L 55/46
137/12
(Continued)

FOREIGN PATENT DOCUMENTS

EP    0736722 A1 * 10/1996 .............. F16L 55/46
EP    2762279 A1    8/2014
(Continued)

OTHER PUBLICATIONS

Exelon Clearsight, https://www.exelonclearsight.com/project/water-tank-inspection/, Feb. 4, 2020, 5 pages (Year: 2020).*
(Continued)

*Primary Examiner* — Clayton E. LaBalle
*Assistant Examiner* — Kevin C Butler
(74) *Attorney, Agent, or Firm* — Sage Patent Group

(57) ABSTRACT

A launching tube for use with a liquid filled tank can be sized to accommodate a submersible vehicle for dispensing into the liquid tank. The tank can be an electrical transformer or any other liquid containing tank such as but not limited to a chemical tank. The launching tube can include a valve for insertion into a launching chamber, and a tank side valve for
(Continued)

launching of the submersible into the tank. In one form the launching tube includes an antenna for communication with the submersible and/or a base station. The launching tube can also include a sensor such as a camera, as well as an agitator. The agitator can be used to facilitate bubble removal from the inside of the launching tube.

23 Claims, 6 Drawing Sheets

Related U.S. Application Data

(60) Provisional application No. 62/431,334, filed on Dec. 7, 2016.

(51) Int. Cl.
| | |
|---|---|
| *H01F 27/04* | (2006.01) |
| *B63G 8/00* | (2006.01) |
| *G01N 9/20* | (2006.01) |
| *B25J 19/02* | (2006.01) |
| *G01G 5/02* | (2006.01) |
| *G05D 1/00* | (2006.01) |
| *B25J 1/00* | (2006.01) |
| *G01M 3/24* | (2006.01) |
| *G01N 9/02* | (2006.01) |
| *B25J 13/00* | (2006.01) |
| *G01N 9/10* | (2006.01) |
| *G01N 9/08* | (2006.01) |
| *H01F 27/12* | (2006.01) |

(52) U.S. Cl.
CPC ............ *B63G 8/00* (2013.01); *G01G 5/02* (2013.01); *G01M 3/24* (2013.01); *G01N 9/02* (2013.01); *G01N 9/08* (2013.01); *G01N 9/10* (2013.01); *G01N 9/20* (2013.01); *G02B 23/2476* (2013.01); *G05D 1/00* (2013.01); *H01F 27/04* (2013.01); *G02B 23/2492* (2013.01); *H01F 27/12* (2013.01)

(58) Field of Classification Search
CPC . B25J 13/00; B25J 19/02; B63G 8/00; G01M 3/24; G05D 1/00
USPC .......................................................... 73/437
See application file for complete search history.

(56) References Cited

U.S. PATENT DOCUMENTS

| | | | | |
|---|---|---|---|---|
| 4,821,665 | A * | 4/1989 | Matthias | B63B 71/00 114/222 |
| 5,947,051 | A * | 9/1999 | Geiger | B62D 57/00 114/222 |
| 6,263,896 | B1 * | 7/2001 | Williams | F16K 7/10 137/15.15 |
| 6,446,662 | B1 * | 9/2002 | Wagner | F16L 41/04 137/15.14 |
| 2007/0095398 | A1 * | 5/2007 | German | F16L 41/04 137/317 |
| 2010/0180672 | A1 * | 7/2010 | Zollinger | G01N 29/11 73/61.63 |
| 2012/0257704 | A1 * | 10/2012 | Asada | G21C 17/013 376/249 |
| 2018/0154995 | A1 * | 6/2018 | Cole | B63G 8/22 |
| 2018/0157251 | A1 * | 6/2018 | Cole | B63G 8/24 |
| 2018/0158232 | A1 * | 6/2018 | Cole | B63G 8/001 |
| 2019/0286119 | A1 * | 9/2019 | Cole | G07C 5/08 |
| 2019/0286146 | A1 * | 9/2019 | Cole | G05D 1/0094 |
| 2019/0287688 | A1 * | 9/2019 | Cole | G21C 17/013 |
| 2019/0325668 | A1 * | 10/2019 | Cole | G01N 1/22 |

FOREIGN PATENT DOCUMENTS

| | | | | |
|---|---|---|---|---|
| JP | S604699 | A | 1/1985 | |
| JP | H01138445 | A | 5/1989 | |
| JP | H057305 | U | 2/1993 | |
| JP | 2004290859 | A | 10/2004 | |
| WO | WO-2006078873 | A2 * | 7/2006 | ............... E03F 7/10 |
| WO | 2014075900 | A1 | 5/2014 | |
| WO | WO-2014075900 | A1 * | 5/2014 | ............. F16L 55/46 |
| WO | WO-2014120568 | A1 * | 8/2014 | ......... G01N 21/9072 |
| WO | WO-2018104790 | A1 * | 6/2018 | ........... G21C 17/013 |

OTHER PUBLICATIONS

Romano et al., Inspection-ClassRemotelyOperatedVehiclesAReview, Journal of Marine Science and Engineering, 2017, 33 pages (Year: 2017).*
Feng et al., 'Hovering_Control_of_A_Submersible_Transformer_ Inspection RObot Based on the ASMBC Method', IEEE Access, Apr. 22, 2020, 12 pages (Year: 2020).*
T&D World,'Oil-Filled Power Transformers: Time for Robotic Inspection?', https://www.tdworld.com/test-and-measurement/article/ 20973023/oilfilled-power-transformers-time-for-robotic-inspection, Aug. 28, 2019, 14 pages (Year: 2019).*
Japanese Office Action for Japanese Patent Application No. 2019-530828 dated Jan. 25, 2021, 6 pages

* cited by examiner

LIQUID TANK INSPECTION INCLUDING DEVICE FOR LAUNCHING SUBMERSIBLE

TECHNICAL FIELD

The present invention generally relates to liquid tank inspection components, and more particularly, but not exclusively, to launch tubes used for an inspection submersible into a liquid tank.

BACKGROUND

Providing liquid tanks with a launch system for inspection submersibles remains an area of interest. Some existing systems have various shortcomings relative to certain applications. Accordingly, there remains a need for further contributions in this area of technology.

SUMMARY

One embodiment of the present invention is a unique tank and launch tube combination. Other embodiments include apparatuses, systems, devices, hardware, methods, and combinations for launching an inspection submersible into a tank. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
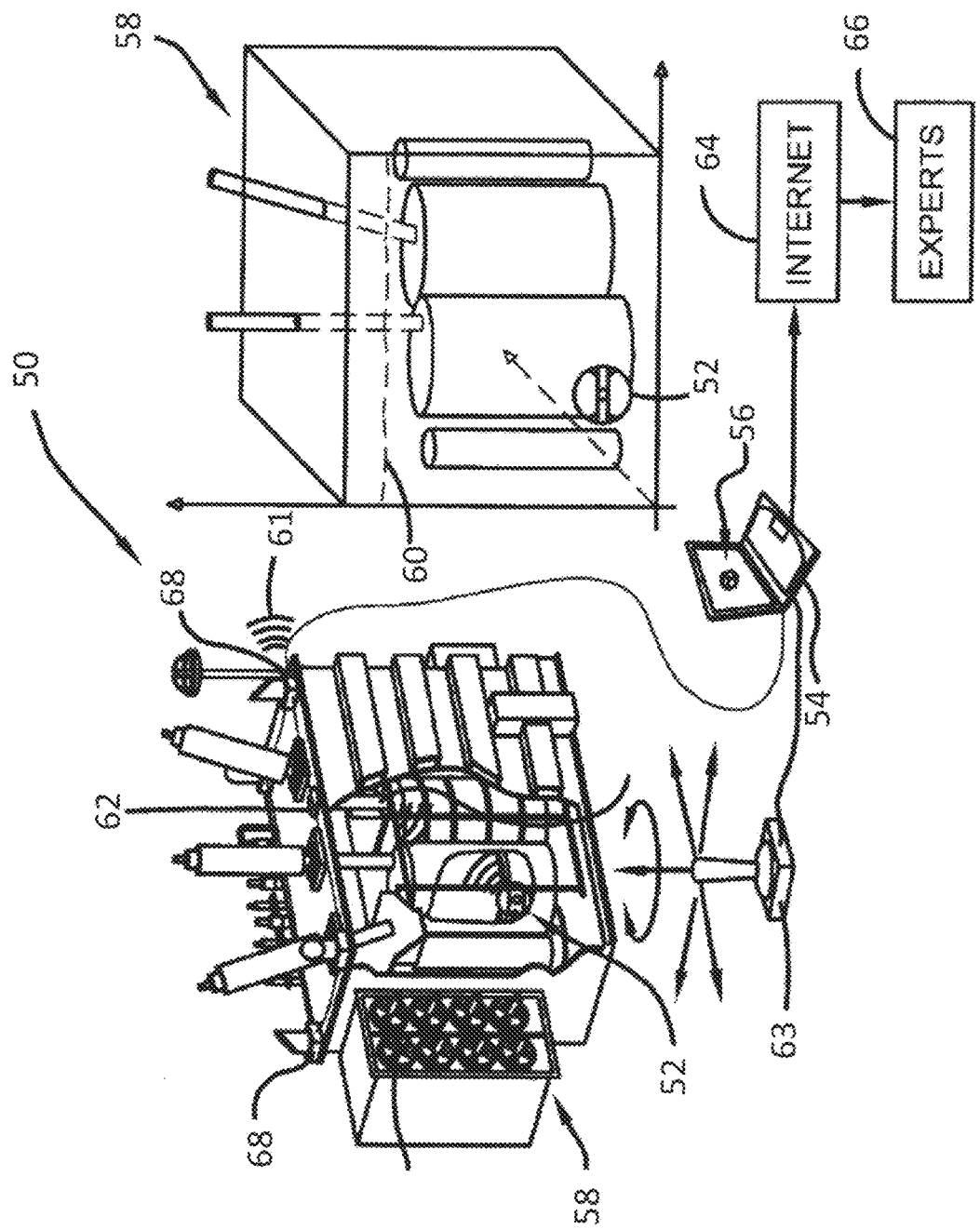
FIG. 1 depicts an embodiment of a submersible drone communicating with a base station.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a system for in-situ inspection designated generally as 50. The system 50 generally includes an inspection device in the form of a submersible remotely operated vehicle (ROV) 52 which is wirelessly controlled from a control station which, in the illustrated embodiment, includes a computer 54 and a display 56. As used herein, the term "submersible" includes, but is not limited to, a vehicle capable of operation under the surface of a liquid body. Although much of the description that follows utilizes the term ROV for sake of brevity, it will be understood that the various embodiments described herein are not strictly limited to remotely operated vehicles, but can also be utilized with autonomous submersibles as well such as but not limited to those that are remotely triggered but are otherwise autonomous. For example, the inspection devices described herein can be static devices that observe and collect data whether remotely operated or in an autonomous configuration. Such a static device can be placed in its location as a result of operation of the ROV or autonomous device. Thus, embodiments of the device 52 are intended to cover a broad range of devices not simply limited to ROVs unless otherwise indicated to the contrary (as one non-limiting example, use of the term 'drone' is capable of covering ROV as well as autonomous devices 52 or static inspection drones useful for monitoring and/or inspection duties).

Of note in FIG. 1, the system 50 includes components generally on the left and bottom side of the figure, with the components on the upper right representing a schematic model of certain aspects of the system 50 (e.g. the tank in which the ROV 52 is operating) which will be understood by those of skill in the art. In many forms the submersible vehicles described herein are capable of operating in a container which maintains a fluid such as a pool or chemical storage tank, but in other forms can be a sealed container such as a tank. The liquid can take any variety of forms including water, but other liquid possibilities are also contemplated. By way of example, and not limitation inspection may be performed on portions of ship hulls, electrical interrupters, high voltage switch gears, nuclear reactors, fuel tanks, food processing equipment, floating roof storage system, chemical storage tank, or other apparatuses of similar nature.

The submersible ROV 52 shown in the illustrated embodiment is being used to inspect a tank for a transformer 58, but other applications are contemplated herein. Skilled artisans will appreciate that the inspection typically, but not exclusively, occurs only when the transformer 58 is offline or not in use. In many embodiments the transformer 58 utilizes its liquid as a cooling fluid 60 to maintain and disburse heat generated by the internal components during operation of the transformer. The cooling fluid 60 can be any liquid coolant contained within an electrical transformer, such as but not limited to a liquid organic polymer. Such liquid can therefore be transformer oil, such as but not limited to mineral oil. In other forms the transformer liquid can be pentaerythritol tetra fatty acid natural and synthetic esters. Silicone or fluorocarbon-based oils can also be used. In still other forms a vegetable-based formulation, such as but not limited to using coconut oil, may also be used. It may even be possible to use a nanofluid for the body of fluid in which the robotic vehicle is operating. In some embodiments, the fluid used in the transformer includes dielectric properties. Mixtures using any combination of the above liquids, or possibly other liquids such as polychlorinated biphenyls may also be possible.

As skilled artisans will appreciate, the transformer 58 is typically maintained in a sealed configuration so as to prevent contaminants or other matter from entering. As used herein, a "sealed configuration" of the tank allows for sealed conduits and/or ducts to be associated with the transformer's tank or housing to allow for connection to the electrical components and/or monitoring devices maintained in the tank. The tank is also provided with at least one opening to allow for the filling and/or draining of the cooling fluid. As shown in FIG. 1, a hole 62 can be an existing service hole, e.g. those used for filling the transformer oil and/or those used to enter a tank upon servicing by a technician. In general operation, the oil is inserted through any number of holes located in the top of the tank. Holes 62 may also be provided at the bottom of the tank to allow for the fluid to be drained. The holes 62 are provided with the appropriate plugs or caps. In some embodiments the hole 62 can be sized and structured such that the transformer tank top need not be unsealed completely or at all to introduce the submersible ROV 52. Accordingly, it will be appreciated that the size of the inspection device can be such that it can fit within a designated hole, whether the hole is the hole 62 depicted in the illustration or other types of access points discussed elsewhere herein and/or appreciated by those of skill in the art.

The ROV 52 is insertable into the transformer 58 or sealed container and is contemplated for purposes of the various embodiments herein as being movable utilizing un-tethered, wireless remote control. In the illustrated embodiment the computer 54 (depicted as a laptop computer in the illustrated embodiment although other appropriate computing devices are also contemplated) is contemplated to be in wireless communication with the ROV 52. A motion control input device, such as a joystick 63 is connected to the computer 54 and allows for a technician to control movement of the device 52 inside the transformer 58. Such control can be by visual awareness of the technician and/or by information made available via the display 56 (such as, but not limited to, a virtual model of the transformer 58). Other types of motion control input devices, such as used in video games, handheld computer tablets, computer touch screens or the like may be employed.

In some embodiments the computer 54 can be connected to another computer via a network, such as the depicted internet 64 as one example, so as to allow for the images or sensor data to be transferred to experts, who may be remotely located, designated by the block 66 so that their input can be provided to the technician so as to determine the nature and extent of the condition within the transformer and then provide corrective action as needed. In some embodiments, control of the ROV can also be transferred to an expert, who may be remotely located. In such embodiments, the expert would have another computer that can send control signals via a network to the local computer 54 that in turn sends signals to control the device 52 as described above.

The transformer 58 may be configured with a plurality of signal transmitters and/or receivers 68 mounted on the upper corners, edges or other areas of the transformer 58, or in nearby proximity to the transformer. The transmitters and/or receivers 68 are structured to send and/or receive a wireless signal 61 from the inspection device to determine the position of the inspection device in the transformer tank.

The transmitters and/or receivers 68 can be a transceiver in one embodiment, but can include a transmitter and antenna that are separate and distinct from one another in other embodiments. For example, the transmitter can be structured to send information using different frequencies/ modulation/protocols/etc than an antenna is structured to receive. Thus as used herein, the term "transmitter" and "antenna" can refer to constituent parts of a transceiver, as well as standalone components separate and apart from one another. No limitation is hereby intended unless explicitly understood to the contrary that the term "transmitter" and/or "antenna" are limited to stand alone components unless otherwise indicated to the contrary. Furthermore, no limitation is hereby intended that the use of the phrase "transmitters and/or receivers" must be limited to separate components unless otherwise indicated to the contrary.

Informational data gathered by the ROV 52, and any associated sensor, can be transmitted to the computer 54 through the fluid and the tank wall with the openings 62. Use of different communication paths for difference aspects of the operation of the ROV 52 may be used to prevent interference between the signals. Some embodiments may utilize the same communication path to transfer data related to positioning, data information, and control information as appropriate.

Figure 2:
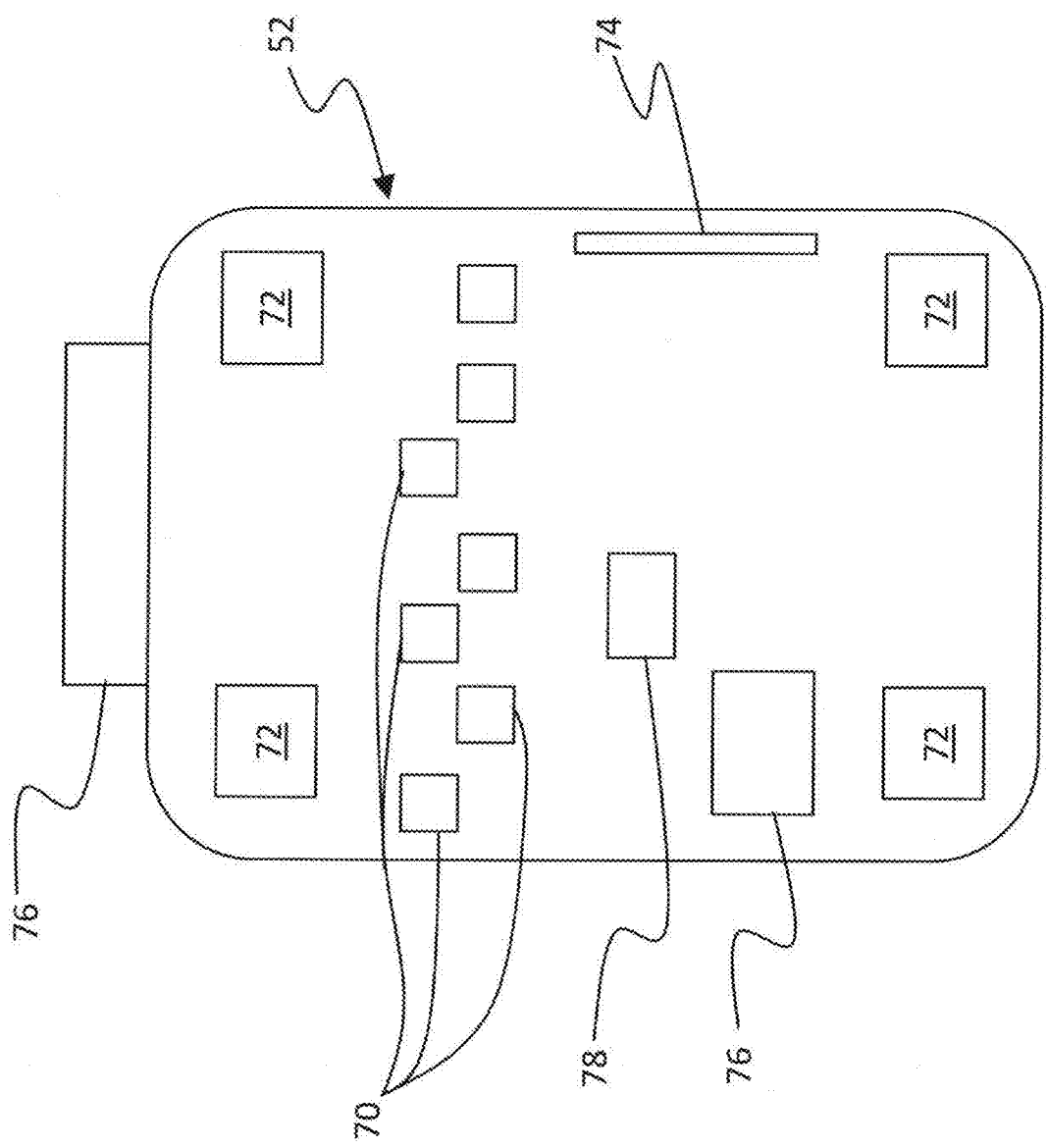
FIG. 2 depicts one embodiment of the submersible drone.

Turning now to FIG. 2, one embodiment of the ROV 52 is depicted as including cameras 70, motors 72 and transmitter and/or receiver 74. Other components may also be included in the ROV but are not illustrated for sake of brevity (e.g. a battery to provide power to the cameras, additional sensors such as rate gyros or magnetometers, etc). The cameras 70 are utilized to take visible and other wavelength images of the internal components of the transformer. In one embodiment of the ROV 52 a number of cameras are fixed in orientation and do not have separate mechanisms (e.g. a servo) two change their point of view. In other embodiments all cameras the ROV 52 have a fixed field of view and not otherwise capable of being moved. These images allow for technicians to monitor and inspect various components within the transformer. The cameras 70 can take on any variety of forms including still picture and moving picture cameras (e.g. video camera). Any number and distribution of the cameras 70 are contemplated. In one form ROV 52 can have an array of cameras 70 distributed in one region, but in other forms the cameras 70 can be located on all sides of the ROV 52. In some embodiments, the ROV 52 is provided with lights which facilitate illumination of the area surrounding the inspection device 52. In some embodiments the lights are light emitting diodes, but it will be appreciated that other illumination devices could be used. The illumination devices are oriented so as to illuminate the viewing area of one or more of the cameras 70. In some embodiments, the user can control the intensity and wavelength of the light.

The motors 72 are used to provide power to a propulsor (e.g. an impeller) which are used to control and/or provide propulsive power to the ROV 52. Each motor 72 can be reversible so as to control the flow of fluid or oil through the flow channels. Each motor can be operated independently of one another so as to control operation of an associated propulsor (e.g. a thruster pump) such that rotation of the pump in one direction causes the liquid to flow through the flow channel in a specified direction and thus assist in propelling ROV 52 in a desired direction. Other configurations of the propulsor are also contemplated beyond the form of a propeller mentioned above, such as a paddle-type pump which could alternatively and/or additionally be utilized. In some embodiments, a single motor may be used to generate a flow of fluid through more than one channel. In other words, a housing of the ROV 52 could provide just one inlet and two or more outlets. Valves maintained within the housing could be used to control and re-direct the internal flow of the fluid and, as a result, control movement of the ROV 52 within the tank. Fluid flow from the motor can also be diverted such as through use of a rudder, or other fluid directing device, to provide the steerage necessary to manipulate the vehicle. By coordinating operation of the motors with a controller, and thus the oil flowing through the housing of the ROV, the inspection device can traverse all areas of the transformer through which it can fit. Moreover, the ROV 52 is able to maintain an orientational stability while maneuvering in the tank. In other words, the ROV 52 can be stable such that it will not move end-over-end while moving within the transformer tank.

The transmitter and/or receiver 74 can be connected to a controller on board the ROV 52 for the purpose of transmitting data collected from the cameras 70 and also for sending and receiving control signals for controlling the motion and/or direction of the ROV 52 within the transformer. The transmitter and/or receiver 74 is structured to generate a wireless signal that can be detected by the computer or any intermediate device, such as through reception via the transmitter and/or receiver 68.

Other aspects of an exemplary remotely operated submersible which is operated in a fluid filled transformer tank described in FIG. 1 or 2 are described in international application publication WO 2014/120568, the contents of which are incorporated herein by reference.

Referring now to FIGS. 1 and 2, transmissions from either or both of the transmitters and/or receivers 68 and 74 can occur over a variety of manners, including various frequencies, powers, and protocols. In some applications the communication between the ROV 52 and the base station can be supplemented with a repeater or relay station, but not all embodiments need include such devices. The manners of transmission between 68 and 74 need not be identical in all embodiments. To set forth just a few examples, the transmitter and/or receiver 68 used for broadcast of signals from the base station can transmit in power that ranges from 1 W to 5 W. The base station can also transmit in frequencies that that range from about 300 MHz to about 5 GHz, and in some forms are at any of 300 MHz, 400 MHz, 433 MHz, 2.4 GHz, and 5 GHz. Transmission can occur using any variety of protocols/formats/modulation/etc. In one example, transmission from the base station can use digital radio communications such as that used for RC model cars/boats/airplanes/helicopters. The transmission can also occur as TCP/IP or UDP, it can occur over WiFi radios, serial communication over Bluetooth radios, etc. In one particular form, video transmissions can occur as streaming for a Wi-Fi camera over 2.4 GHz.

In much the same manner as the transmitter and/or receiver 68 of the base station, the transmitter and/or receiver of the ROV 52 can transmit in power that ranges from 250 mW to 3 W. The base station can also transmit in frequencies that that range from about 300 MHz to about 5 GHz, and in some forms are at any of 300 MHz, 400 MHz, 433 MHz, 2.4 GHz, and 5 GHz. Transmission can occur using any variety of protocols/formats/modulation/etc. In one example, transmission from the base station can use digital radio communications such as that used for RC model cars/boats/airplanes/helicopters. The transmission could be video over IP, and one embodiment of IP could be WiFi/WLAN. In one non-limiting embodiment the transmission can therefore occur as TCP/IP or UDP, it can occur over WiFi radios, serial communication over Bluetooth radios, etc. In one particular form, video transmissions can occur as streaming for a Wi-Fi camera over 4.2 GHz. IN short, a variety of transmission techniques/approaches/protocols/frequencies/etc are contemplated herein.

The ROV 52 can also include a ballast system 76 among other components 78 such as, but not limited to, control circuitry, signal processing, payload support mechanisms, etc. In one form the ballast system 76 can be a recirculating air ballast system that includes an inflatable ballast bag to provide displacement with inflation.

Figure 3:
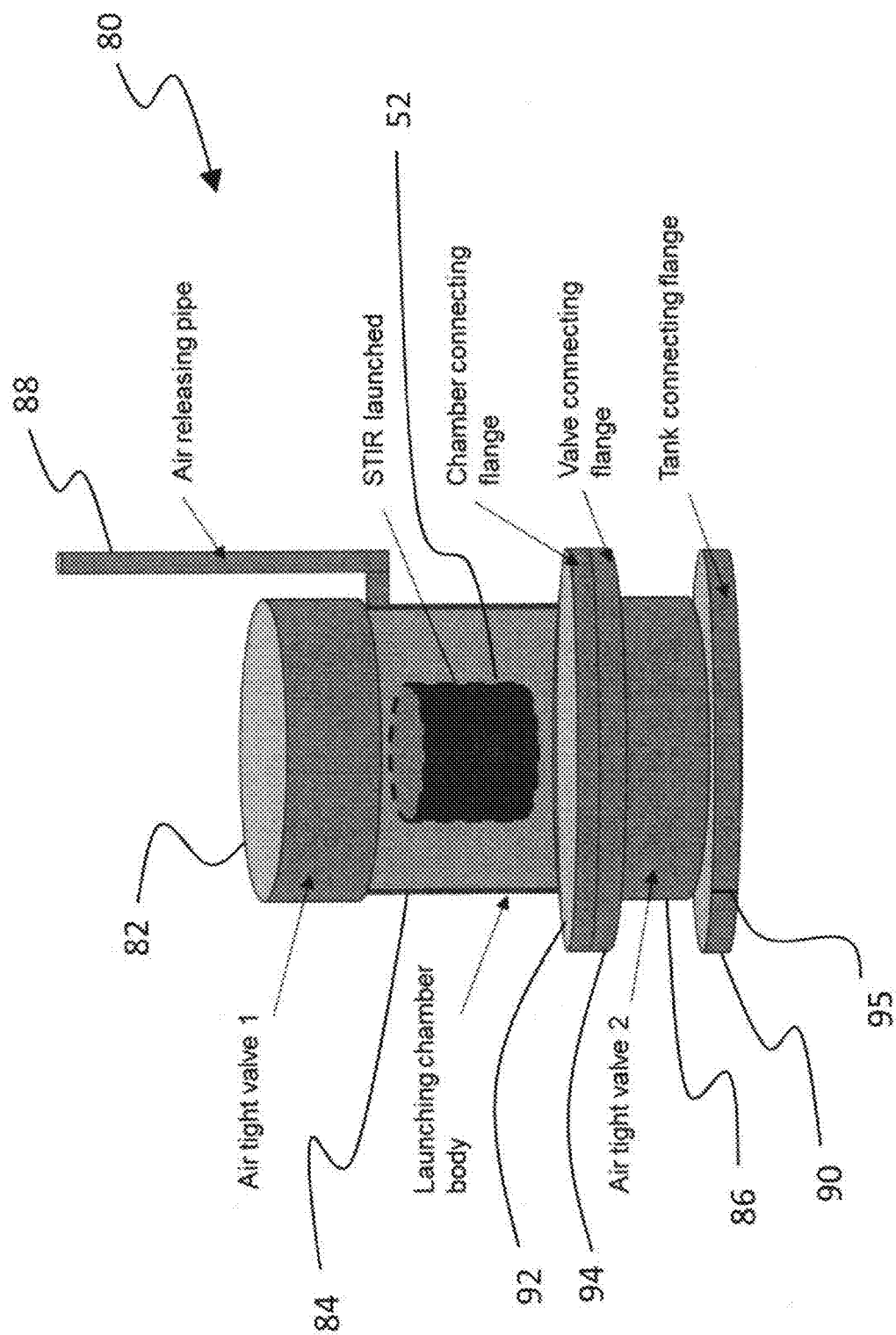
FIG. 3 depicts an embodiment of a launch tube.

Turning now to FIG. 3, one embodiment of a launcher tube 80 is shown which can be used to introduce the ROV 52 into the tank. The launcher tube can include an outside valve 82 (described in one nonlimiting embodiment as an "air tight valve"), a launching chamber 84, a tank side valve 86 (described in one nonlimiting embodiment as an "air tight valve"), and an air release conduit 88 (in one nonlimiting embodiment the conduit is a pipe). During operation, the outside valve 82 can be opened to permit insertion of the ROV 52 into the launching chamber 84. After the ROV 52 is received into the chamber 84, the outside valve 82 can be closed and liquid can be filled into the chamber 84. The liquid can be filled from an outside source or can be filled from liquid already present in the tank 58. Such a fill process can occur as a result of partially or totally opening the tank side valve 86. Air that is present in the tank 58 can escape during the fill process via the passage 88.

The outside valve 82 can take on any suitable form necessary to permit opening and closing of the launching chamber 84 from the outside. The valve 82 can be secured in place via any number techniques, including mechanical, magnetic, etc. For example, the valve 82 can be secured in place using a number of fasteners, it can be hinged at one side and compressed shut through a lever mechanism, and it can be sealed shut using magnetic and/or electromagnetic principles. In some embodiments, the valve 82 will seal the chamber 84 shut such that liquid is prohibited from escaping.

The launching chamber 84 resides between the outside valve 82 and tank side valve 86 and can take on a variety of shapes and sizes. In one form the launching chamber 84 is made of clear plastic material such that the interior of the chamber 84 can be monitored during a fill or drain activity.

The tank side valve 86 can take on any suitable form necessary to permit opening and closing of the launching chamber 84 to the inside of the tank 58. The valve 86 can be releasably secured to the tank 58 via any number techniques, including mechanical, magnetic, etc. In the illustrated embodiment the tank side valve 86 includes a flange 90 which permits attachment to the tank 58. Whether through use of the flange 94 or other structure, the launching tube 80 can be releasably attached to the tank 58 to permit insertion and retrieval of the ROV 58 from the tank 58, and then be removed for a subsequent launch and retrieval evolution in another separate tank 58. In one form the launching tube 80 can be attached via a series of fasteners that are inserted into openings of the flange 90. In other forms the flange 90 can include one or more registration surfaces 95 that are received in complementary registration surfaces of the tank 58. Such registration surfaces can be used to translatingly received the tube 80 onto the tank 58 at which point the tube 58 could be rotated and compressed into place for the duration of a launch and recovery cycle. In any given embodiment of the connection type used between the tube 80 and tank 58, a sealer such as, but not limited to, a gasket can be used to provide further sealing action against leakage of liquid from the tank 58 to the outside. Such a gasket can be received in a recess formed in either or both of the tube 80 side connection or the tank 58 side connection surface.

The movable component of the valve 86 can include a door that is hinged at one side and compressed shut through a lever mechanism, it can be sealed shut using magnetic and/or electromagnetic principles, etc. In some embodiments, the valve 86 will seal the chamber 84 shut such that liquid is prohibited from escaping.

In one form the valves 82 and 86 are assembled at the ends of a monolithic continuous construction that includes the chamber 84, but other embodiments such as the illustrated form include constituent components which include connection devices which are attached to form the entire assembly. In the illustrated embodiment the chamber 84 is connected to a flange 92 that itself is connected to a corresponding flange 94 of the valve 86. The complementary flanges can be connected using any variety of techniques such as mechanical (e.g. bolts), chemical (e.g. bonding), and metallurgical (e.g. welding), to set forth just a few nonlimiting embodiments.

It will be appreciated that although the interior of the launching chamber 84 can be cylindrical in shape, other tube shapes are also contemplated herein. For example, the inside of the launching chamber 84 can have a rectilinear shape such as a square interior tube shape. Any suitable shape can be used on the inside of the tube such that the ROV 52 can be inserted prior to introduction to the tank 58.

Though the passage 88 is shown as a right angled pipe in the illustrated embodiment, other forms are also contemplated. For example, the passage 88 can take the form of a simple orifice on the outside of the launching tube 88 which provides a conduit through which air can escape. For that matter, any type of physical device useful to direct air from the inside of the tube can be used, whether the device leads to an elongated passage well away from the tube or is a short opening through which air can escape.

Figure 4:
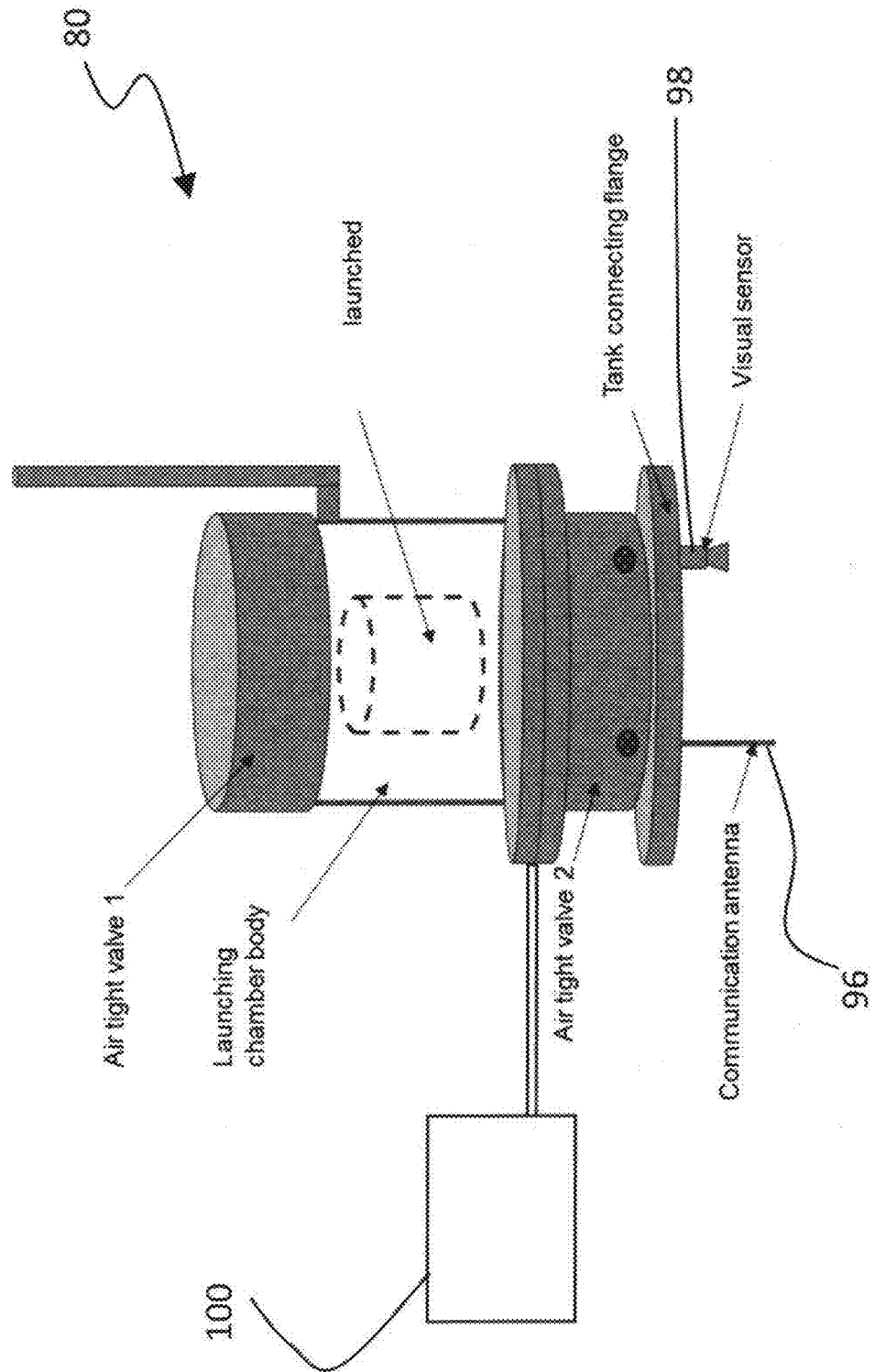
FIG. 4 depicts an embodiment of a launch tube.

Turning now to an additional and/or alternative embodiment depicted in FIG. 4, the launch tube 80 can include any one or more additional components than those depicted above in FIG. 3. The illustrated embodiment in FIG. 4 depicts a communication antenna 96, a visual sensor 98, and an agitator 100. The communication antenna 96 can be used to transmit and/or receive information much in the manner of the transmitter and/or receivers 68 and 74 mentioned above, whether the information is to/from the ROV 52 or the base station. The visual sensor 98 can take the form of a camera in one embodiment (whether still or motion video), but can be structured to capture other wavelengths as well. In one form the visual sensor 98 can be used to dock the ROV 52 back into the launch tube 80. Connectors can be placed on the body of the launching tube 80 for connecting to external instruments during the launching, inspection, or recovery operations.

The agitator 100 can be any device suitable to induce motion in the contents of the dispensing tube 80 to cast off gas bubbles formed within the tube. Such gas bubbles can be formed on the ROV 52, but can also form on an inside surface of the launching chamber 84, or the valves 82/86, etc. The agitator can take any number of forms, including a fluid movement device and a vibratory movement device. In one form the agitator 100 can be a piezoelectric actuated agitator to produce vibrations in any of the launch tube, submersible vehicle, and fluid, but other mechanisms are also contemplated herein. The agitator 100 can also take the form of a fluid moving device such as a bladed screw that induces fluid flow within the launching tube. In still other forms, the vibratory agitator 100 can be combined with the fluid moving agitator.

Figure 5:
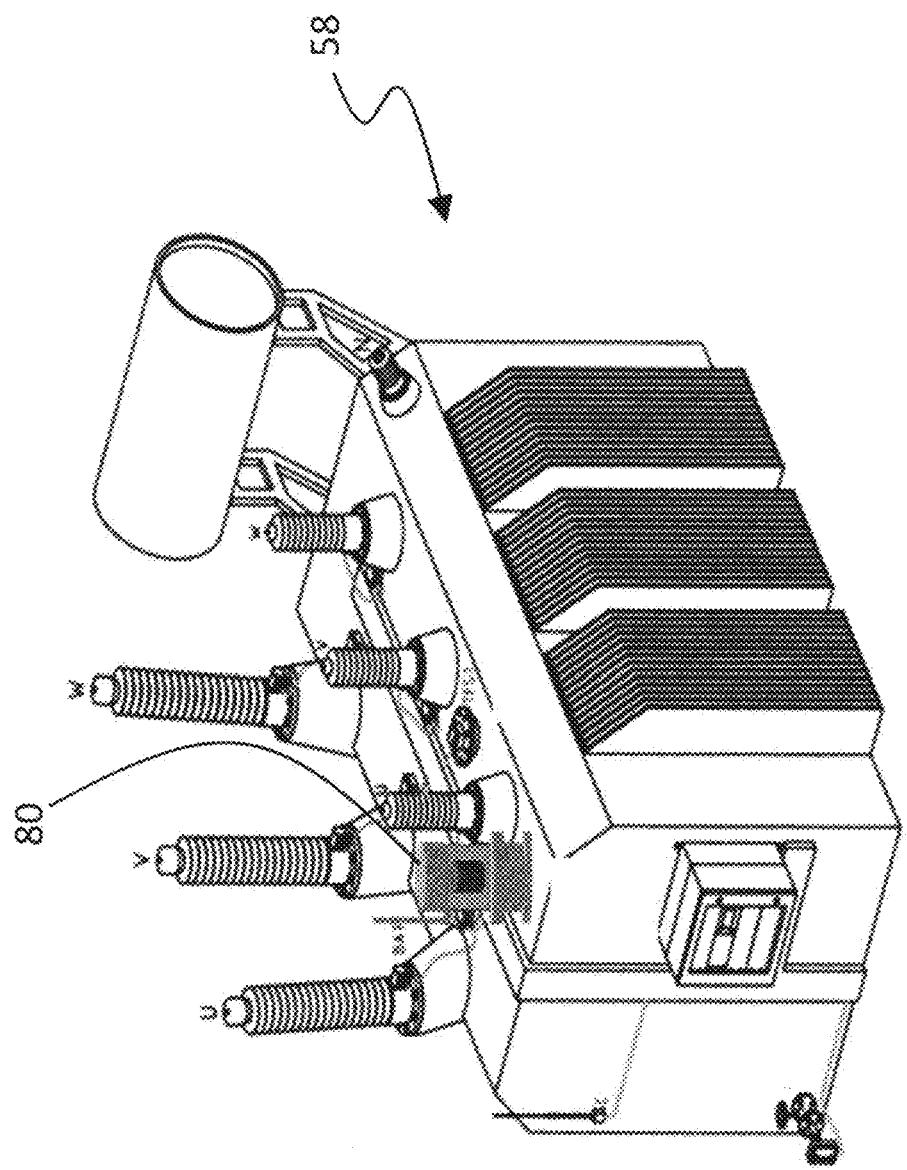
FIG. 5 depicts an embodiment of a tank having a launch tube mounted on top of the tank.
Figure 6:
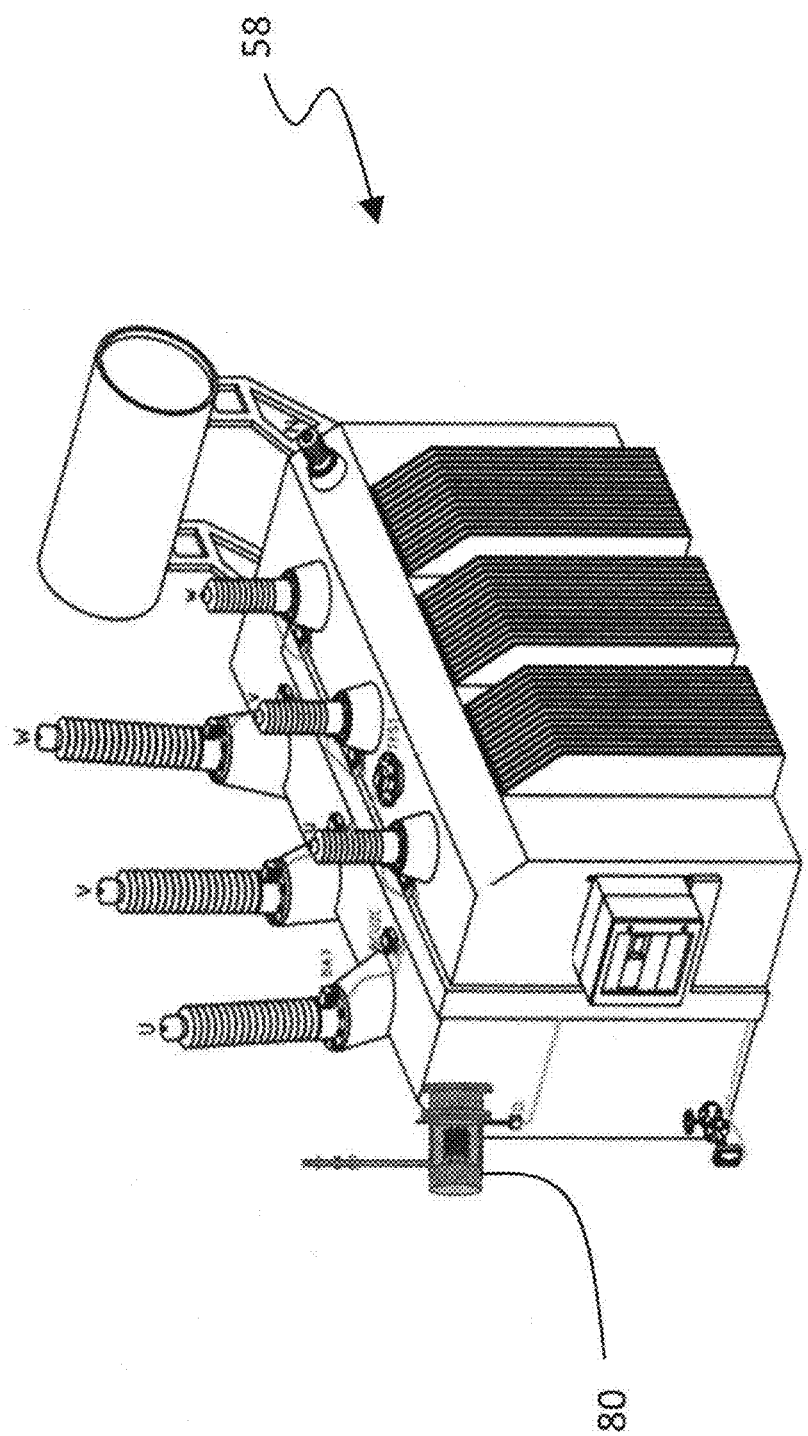
FIG. 6 depicts an embodiment of a tank having a launch tube mounted on the side of the tank.

Turning now to FIGS. 5 and 6, alternative embodiments are depicted in which the launch tube 80 is placed at different locations of the tank 58. FIG. 5 depicts an embodiment in which the launch tube 80 is releasably fastened on top of the tank 58. FIG. 6 depicts an embodiment in which the launch tube 80 is releasably fastened on the side of the tank 58. It will be appreciated herein that although many embodiments described above depict the launch tube 80 as releasably fastened, some embodiments can include a launch tube 80 that is permanently fastened and/or integrated into the tank 58. In any event, in those embodiments where the launch tube 80 is releasably fastened, the launch tube 80 is constructed that permits portable travel to another tank 58. Such portable travel includes the ability to be handled as a unit and in some forms may include a convenient handle to permit handy removal and transport to another tank 58. The handle could be integrated into the launch tube 80 at any convenient location, whether on the outside valve 82, launch chamber 84, etc. In some forms one or more components of the launch tube 80 can be removed (e.g. the embodiment of the pipe 88 as shown illustrated in FIG. 3) to permit safe handling and transport.

The tank 58 can include a removable cover that permits access to the interior of the tank. Such a cover can be removed prior to attachment of the launch tube 80, but other embodiments envision a tank cover that can remain in place during installation of the launch tube 80, with a subsequent removal of the cover after installation of the tube 80. The tank cover can be removed and/or set aside by an operation that occurs exterior of the tank, but that the cover nonetheless remains inside the tank during the operation. Such would be the case of a door that is hinged to move into the interior of the tank and out of the way of the ROV 52 when it is inserted into the tank 58. The tank cover can be replaced and secured into place prior to removal of the launch tube 80.

One mode of operation of the system 50 that can be used in whole or in part to various embodiments described above progresses as follows: to ensure reliable communication between the device 52 and the computer 54, a transceiver 68 can be inserted into the cooling oil tank through the service opening on the top of the transformer. In most embodiments, the transceiver 68 is used to exchange data information from a sensor on the ROV and the camera 70, via a controller to the computer 54; and motion control or maneuvering signals from the joystick 63 via the computer 54 to the controller so as to operate the motors 72 and thrusters. The signal 84, transmitted by the receiver 82 is used by the computer 54 to provide a separate confirmation to the device's position within the tank.

The computer 54 receives the position signals and information signals and in conjunction with a virtual image correlates the received signals to the virtual image so as to allow a technician to monitor and control movement of the inspection device. This allows the technician to inspect the internal components of the transformer and pay particular attention to certain areas within the transformer if needed. By utilizing a virtual image of the internal features of the transformer and the position of the inspection device with respect to those virtual features, the image obtained can be matched with the corresponding site inside the actual transformer tank. Based on the visual representation of the transformer image and a possible virtual inspection device in relation to the image, a technician can manipulate the joystick 63 response. The computer 54 receives the movement signals from the joystick and transmits those wirelessly to the antenna 74, whereupon the controller implements internally maintained subroutines to control the thrusters to generate the desired movement. This movement is monitored in realtime by the technician who can re-adjust the position of the device 52 as appropriate.

One aspect of the present application includes an apparatus comprising a liquid tank structured to enclose a working liquid within an interior of the tank, the tank including a port through which a robotic submersible can be inserted into the tank from an exterior position, the port coupled with a launching tube attached opposite the interior of the liquid tank, the launching container having an outside valve configured to be opened and closed, a launching chamber sized to receive the robotic submersible through the outside valve, and a tank-side valve placed opposite the launching chamber from the outside valve and structured to be open to permit ingress of the robotic submersible into the interior of the tank.

A feature of the present application further includes an air release passage in fluid communication with the launching chamber.

Another feature of the present application further includes an agitator structured to cause the release of air bubbles in a liquid medium within the launching chamber.

Still feature of the present application includes wherein in the launching tube is attached to the top of the tank, and which further includes a communication antenna.

Yet another feature of the present application includes wherein the launching tube is attached to a side of the tank, and which further includes a visual sensor.

Still yet another feature of the present application includes wherein the tank is an electrical transformer and the liquid is a transformer coolant.

Yet still another feature of the present application includes wherein the launching tube is portable and is releasably attached to the liquid tank such that it can be moved to another liquid tank for inspection.

A further feature of the present application includes wherein the port further includes a cover that can be moved out of the way during launch operations and can be replaced to permit disengagement of the launching container from the tank.

Another aspect of the present application includes an apparatus comprising a modular dispensing tube having a top side valve, a launching chamber sized to accommodate a robotic drone inserted through the top side valve, and a bottom side valve structured to release the remotely operated vehicle from the launching chamber, the modular dispensing tube also including an air release passageway in fluid communication with the launching chamber and having a purge valve structured to have an open position in which the air release passage allows air to escape from the launching chamber during a pre-launch liquid fill event, the purge valve also structured to have a closed position to discourage the escape of liquid from the launching chamber, wherein the modular dispensing tube is configured as a portable dispensing tube having a connection surface structured to releasably engage with a liquid fluid tank to insert the robotic drone into the liquid fluid tank, and to be disengaged to permit portable movement of the dispensing tube to be used on another liquid fluid tank.

A feature of the present application further includes an agitator structured to remove bubbles from the contents of the launching chamber.

Another feature of the present application includes wherein the agitator is a vibrator structured to induce vibrations in the contents of the launching chamber.

Still another feature of the present application includes wherein the agitator is a fluid moving device structured to induce a flow of fluid within the launching chamber.

Yet another feature of the present application includes wherein the connection surface includes a plurality of registration surfaces.

Still yet another feature of the present application includes wherein the connection surface includes a plurality of apertures though which a plurality of fasteners are inserted.

Yet still another feature of the present application includes wherein the connection surface is complementary to a connection pad of a liquid tank to which the connection surface is mated.

A further feature of the present application further includes the liquid tank, wherein the liquid tank is an electrical transformer tank, and which a mating connection between the connection surface of the modular dispensing tube and the connection pad of the transformer tank includes a provision for the receipt of a gasket.

Yet a further feature of the present application includes wherein the modular dispensing tube further includes at least one of a communication antenna and a visual sensor.

Still another aspect of the present application includes a method comprising attaching a portable launching tube to a surface of a liquid tank, inserting a submersible vehicle into the portable launching tube, closing an outside valve to isolate the submersible within the launching tube, venting air through an air release passage as liquid from the liquid tank fills into the portable launching tube, opening a launch valve to place the liquid inside the launching tube in communication with liquid inside the liquid tank, launching the submersible vehicle, and removing the portable launching tube from the liquid tank.

A feature of the present application further includes recovering the submersible vehicle into the launching tube.

Another feature of the present application further includes draining liquid from within the launching tube before the removing the portable launching tube from the liquid tank.

Still another feature of the present application further includes agitating the contents of the launching tube before opening the launch valve to remove air bubbles.

Yet still another feature of the present application further includes venting the agitated air bubbles through the air release passage.

Still yet another feature of the present application includes wherein the liquid tank is an electrical transformer, and which further includes communicating with a remote device via an antenna attached to the launching tube.

Yet still another feature of the present application further includes capturing target information via a visual sensor.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:
1. An apparatus comprising:
  a liquid tank structured to enclose a working liquid within an interior of the liquid tank, the liquid tank including a port through which a robotic submersible can be inserted into the liquid tank from an exterior position, the port coupled with a launching tube attached opposite the interior of the liquid tank, the launching tube having an outside valve configured to be opened and closed, a launching chamber sized to receive the robotic submersible through the outside valve, a tank-side valve placed opposite the launching chamber from the outside valve and structured to be open to permit ingress of the robotic submersible into the interior of the liquid tank, and an air release passage in fluid communication with the launching chamber to enable air to escape from the launching chamber as liquid fills into the launching chamber.

2. The apparatus of claim 1, which further includes an agitator structured to cause the release of air bubbles in a liquid medium within the launching chamber.

3. The apparatus of claim 1, wherein in the launching tube is attached to a top of the liquid tank, and which further includes a communication antenna.

4. The apparatus of claim 1, wherein the launching tube is attached to a side of the liquid tank, and which further includes a visual sensor.

5. The apparatus of claim 1, wherein the liquid tank is an electrical transformer and the working liquid is a transformer coolant.

6. The apparatus of claim 1, wherein the launching tube is portable and is releasably attached to the liquid tank such that it can be moved to another liquid tank for inspection.

7. The apparatus of claim 1, wherein the port further includes a cover that can be moved out of the way during launch operations and can be replaced to permit disengagement of the launching tube from the liquid tank.

8. An apparatus comprising:
a modular dispensing tube having a top side valve, a launching chamber sized to accommodate a robotic drone inserted through the top side valve, and a bottom side valve structured to release the robotic drone from the launching chamber, the modular dispensing tube also including an air release passageway in fluid communication with the launching chamber and having a purge valve structured to have an open position in which the air release passage allows air to escape from the launching chamber during a pre-launch liquid fill event, the purge valve also structured to have a closed position to discourage the escape of liquid from the launching chamber, wherein the modular dispensing tube is configured as a portable dispensing tube having a connection surface structured to releasably engage with a liquid fluid tank to insert the robotic drone into the liquid fluid tank, and to be disengaged to permit portable movement of the modular dispensing tube to be used on another liquid fluid tank.

9. The apparatus of claim 8, which further includes an agitator structured to remove bubbles from the contents of the launching chamber.

10. The apparatus of claim 9, wherein the agitator is a vibrator structured to induce vibrations in the contents of the launching chamber.

11. The apparatus of claim 9, wherein the agitator is a fluid moving device structured to induce a flow of fluid within the launching chamber.

12. The apparatus of claim 9, wherein the connection surface is complementary to a connection pad of a liquid tank to which the connection surface is mated.

13. The apparatus of claim 12, which further includes the liquid fluid tank, wherein the liquid fluid tank is an electrical transformer tank, and which a mating connection between the connection surface of the modular dispensing tube and the connection pad of the electrical transformer tank includes a provision for the receipt of a gasket.

14. The apparatus of claim 12, wherein the modular dispensing tube further includes at least one of a communication antenna and a visual sensor.

15. The apparatus of claim 8, wherein the connection surface includes a plurality of registration surfaces.

16. The apparatus of claim 8, wherein the connection surface includes a plurality of apertures though which a plurality of fasteners are inserted.

17. A method comprising:
attaching a portable launching tube to a surface of a liquid tank;

inserting a submersible vehicle into the portable launching tube;

closing an outside valve to isolate the submersible vehicle within the portable launching tube;

venting air through an air release passage as liquid from the liquid tank fills into the portable launching tube;

opening a launch valve to place the liquid inside the portable launching tube in communication with liquid inside the liquid tank;

launching the submersible vehicle; and removing the portable launching tube from the liquid tank.

18. The method of claim 17, which further includes recovering the submersible vehicle into the portable launching tube.

19. The method of claim 17, which further includes draining liquid from within the portable launching tube before the removing the portable launching tube from the liquid tank.

20. The method of claim 17, which further includes agitating the contents of the portable launching tube before opening the launch valve to remove air bubbles.

21. The method of claim 17, which further includes venting the agitated air bubbles through the air release passage.

22. The method of claim 17, wherein the liquid tank is an electrical transformer, and which further includes communicating with a remote device via an antenna attached to the portable launching tube.

23. The method of claim 17, which further includes capturing target information via a visual sensor.

* * * * *